United States Patent [19]

Swift et al.

[11] 3,963,512
[45] June 15, 1976

[54] MODIFICATION OF MINERAL SURFACES

[75] Inventors: Jean Drummond Swift, Olinda; David Geoffrey Hawthorne, South Oakleigh; Bryan Clarence Loft, Strathmore; David Henry Solomon, Glen Waverley, all of Australia

[73] Assignee: Commonwealth Scientific and Industrial Research Organization, Campbell, Australia

[22] Filed: Sept. 16, 1974

[21] Appl. No.: 506,448

Related U.S. Application Data

[62] Division of Ser. No. 222,684, Feb. 1, 1972, Pat. No. 3,849,149.

[30] Foreign Application Priority Data

Feb. 10, 1971  Australia............................. 3986/71

[52] U.S. Cl. ...................... 106/308 M; 106/308 Q; 106/308 N; 260/42.14; 260/42.29

[51] Int. Cl.$^2$ ............................................ C09C 1/00
[58] Field of Search ............ 106/308 Q, 308 M, 300

[56] References Cited
UNITED STATES PATENTS

| | | | |
|---|---|---|---|
| 3,808,023 | 4/1974 | Whitehead .......................... | 106/300 |
| 3,834,923 | 9/1974 | Hodgkin et al. .................... | 106/300 |
| 3,890,268 | 6/1975 | Lanzilli et al. ..................... | 106/300 |

*Primary Examiner*—Winston A. Douglas
*Assistant Examiner*—J. V. Howard
*Attorney, Agent, or Firm*—Buell, Blenko & Ziesenheim

[57] ABSTRACT

A method of modifying the surface properties of particulate mineral materials by forming on the surface of the particles a coating having a significant number of acidic sites with pKa values of less than 2.8.

9 Claims, No Drawings

MODIFICATION OF MINERAL SURFACES

This is a division of application Serial No. 222,684 filed Feb. 1, 1972 now U.S. Pat. No. 3849149.

This invention relates to methods of modifying the surface properties of particulate mineral materials to provide pigments or fillers having unique and improved properties, and to materials so treated which have organophilic and/or reinforcing properties, and to organic media or polymeric compositions containing such materials. In particular, the invention is concerned with minerals having "acidic" surfaces (as hereinafter described) and to methods for their manufacture, and also with the treatment of these acidic minerals by coating with organic bases and/or organic monomers susceptible to acid-catalysed polymerization, thereby modifying the surface properties of the minerals. In particular, the organophilic/hydrophilic properties of the minerals can be modified to suit the media in which they are to be used, to provide greater ease of incorporation and uniformity of dispersion in these media, and to provide reinforcement of polymeric plastics or elastomeric compositions containing such modified minerals as pigments or fillers.

The mineral pigments and fillers refer to inorganic materials of natural or synthetic origin, which will be referred to hereinafter as "minerals". The terms "pigment" and "filler" are both used in this specification although those skilled in the art will appreciate that many minerals can function as either or both depending on the circumstances. Generally, the ability of a material to act as a pigment depends on the difference in the refractive indices of the mineral and the medium containing it.

The prior art contains numerous examples in which minerals are modified by application of surface coatings of various inorganic compositions. For example, titanium dioxide pigments are often coated with substances variously referred to as "aluminum oxide", "silicate", "silica-alumina", and similar terms, and many such pigments are available commercially. Such prior art places emphasis on the desirability of (a) essentially neutral surfaces and (b) a minimum level of photochemical activity of the coated pigment. Another example is the modification of kaolin by the application of magnesium silicate surface coatings to improve the dispersibility of the mineral in organic polymer systems.

The present invention has as one aim the provision of acidic surface coatings on minerals, providing materials which have unexpectedly useful properties which will be described hereinafter. It is also known from the prior art that the surface of certain natural aluminosilicate minerals, notably those of the kaolin and bentonite group clays, can be modified to give an enhanced acidic reaction by means of a procedure involving heat treatment. This behaviour is not normally observed with other conventional minerals used as pigments or fillers. Furthermore, it has not been proposed previously to provide these non-acidic minerals with an acidic character by coating their particle surfaces with another acidic substance.

Before defining the present invention it is necessary to define the term "acidity" as used herein. "Acidity" is used in the broad sense to describe the ability of the surface to donate protons to a suitable base (i.e. Brønsted acidity), or to accept an electron, or an electron pair from a suitable organic base (i.e. Lewis acidity). The acidity can be considered in terms of the number of "acid sites" produced on the surface of the material and their "acid strength". We measure both the number and the strength of the surface acid sites by titration of the surface with butylamine in a non-aqueous solvent using a series of organic indicators, usually referred to as Hammett indicators. These indicators have differing pKa values and consequently enable the distribution of sites with various acidites to be obtained. The method used (which is described in the literature) is as follows:

To a sample of the material (4.000 g) dry benzene (20.0 ml) is added. This slurry is then slowly titrated under a dry nitrogen atmosphere with a benzene solution of n-butylamine (0.02 milli molar) using Hammett indicators as external indicators, thorough stirring being maintained during the titration. Samples of commercially available minerals are tested as received, and samples prepared in the laboratory are allowed to stand for at least two weeks before testing, to "condition" and thus be more equivalent to commercial products.

Typical Hammett indicators which can be used for determining the number and strength of acid sites are listed below with their pKa values in order of increasing acid strength: Benzene-azo-naphthylamine (4.0); Dimethyl yellow (p-dimethylamino-azobenzene) (3.3); p-amino-azo-benzene (2.8); p-phenyl-azo-diphenylamine (1.5); dicinnamalacetone (−3.0); Chalcone (benzalacetophenone) (−5.6); anthraquinone (−8.2).

A number of commercially available minerals have been tested to determine the extent of their surface "acid sites". The minerals included; talc, calcium sulphate (Plaster of Paris, FFF grade), calcium carbonate (Whiting C4 superfine, and English powdered whiting), zinc oxide and barium sulphate (Barytes BAF).

In all cases, the "acidity" found using the titration method described above, titrating with butylamine in benzene to a pKa value of 4.0 was nil. In other words, these materials have no sites with an "acidity" of less than 4.0. By the methods of this invention, these and many other minerals can be provided with particle-surface coatings having significant numbers of acid sites with measured pKa values, of less than 2.8. Such materials have unexpectedly useful and desirable properties.

The surface of some clay mineral particles, notably those of kaolinites and montmorillonites, after suitable heat treatment at moderate temperatures to remove adsorbed surface water, can have significant numbers of strongly acidic sites with measured pKa values as low as −8.2. However, by providing these minerals with acidic coatings in accordance with the present invention it is possible to achieve reproducibly a variety of acidic surfaces according to the properties required. By comparison, it is difficult to accurately reproduce different degrees of surface acidity in particular samples of kaolin or other alumino-silicate minerals by heat treatment alone.

In accordance with one aspect of this invention, therefore, we provide a pigment or filler material consisting of a particulate mineral having a surface coating with a significant number of acidic sites with pKa values of less than 2.8. ("Significant" in this context means that the presence of the sites can be detected and their strength measured by the methods described herein).

A wide variety of minerals may be used in accordance with this aspect of the invention, and include: magnesium silicate minerals such as talc; inorganic pigments, colourants, extenders and fillers such as anhydrous and hydrated calcium sulphate, calcium carbonate, zinc oxide, barium sulphate, lithopone (zinc sulphide/barium sulphate), antimony oxide; silica and siliceous materials, such as glass; metal powders and fibres; natural and synthetic mineral fibres, such as chrysotile and amphibole asbestos and glass fibres; clay minerals such as mica, china clay and pyrophillite. This list is not exhaustive, however, and many other materials normally used as mineral fillers or pigments are useful. Titanium dioxide is excluded from this application as it is described in our copending Australian patent applications Nos. PA 3979/71, PA 3981/71, PA 3983/71 and PA 3988/71 all filed on February 10, 1971.

The acidic surface coatings include the oxides and hydrated oxides, silicates, phosphates, and other derivatives of multivalent metals, such as iron, cobalt, nickel, aluminum, chromium, titanium, tin, zirconium, and vanadium, or their mixtures with or without silica or other non-metallic oxides or derivatives. The preferred coatings are alumino-silicate compositions formed by the particular methods hereinafter described. As indicated above, coatings of alumino-silicate compositions are known per se but not with acidities of the defined level.

The products of this aspect of the invention are useful in all of the areas of application in which the minerals, without the treatment of this invention are used. Thus they are useful as pigments or fillers in aqueous and non-aqueous media. They are of particular use in paper coatings, paints, plastics, elastomers, and various specialized applications such as pressure sensitive copy paper. They are also of interest when further modified, as described herein, by reaction with organic bases or suitable monomers.

The new acidic materials offer a number of advantages over the materials currently available, principally:

1. Improved durability of polyethylene films containing the modified minerals.
2. Significant reduction in the viscosity of dispersions of the modified minerals in linseed or paraffin oil compared to that of unmodified mineral dispersions.

It is well known in the art that the surface properties of minerals can be modified by the absorption of organic compounds. For example, titania which has been treated with an alumino-silicate gel-like neutral coating of the prior art may be modified by the addition of triethanolamine, by surfactants, and by polyols such as pentaerythritol. These modified pigments of the prior art suffer from many disadvantages. The surface of the gel-coated or natural pigment is hydrophilic and neutral, and hence the interaction with the organic modifying agents is weak, and only relatively hydrophilic modifying agents can be used. In addition, the original gel-coating may adversely affect the properties of the modified pigment, particularly the tendency to flocculate in nonaqueous systems.

By way of contrast, the strongly acidic surface of the pigments and fillers, described above, largely overcome the problems of the prior art materials.

The second aspect of the present invention is concerned specifically with the treatment of materials possessing acidic surfaces, which interact strongly by acid-base reaction between the acidic surface coating and organic bases, and yield products much less hydrophilic than the materials of the prior art. The acidic materials described above have a significant number of acid sites with pKa values of less than 2.8. All such materials are useful in the present invention, as well as any other minerals having the necessary acidity. These latter include the kaolin and bentonite group clay minerals, illities, attapulgite, natural and synthetic zeolites, and other natural or thermally altered alumino-silicates. The surface acidity of the minerals may be enhanced by pretreatment with dilute acids, or with solutions containing multivalent cations, such as solutions of aluminum salts, and by drying at moderate temperatures, preferably 100° – 150°C, to remove adsorbed water.

In accordance with the second aspect of the present invention a particulate mineral pigment or filler having a surface coating with a signifcant number of acidic sites with a measured pKa of 2.8 or less is treated with an organic base (as hereinafter defined).

The organic bases which can be used in the method of the invention are not restricted to any specific class, but rather can be chosen from the general classes of organic compounds with basic properties. Accordingly, the term "organic base" is used herein in the broad sense to include materials which bond by salt formation, i.e. by accepting a proton from the surface, and materials which donate electrons, or electron pairs, to the surface. The latter are often referred to as Lewis bases. The organic bases may be selected from the classes comprising amines, amides, amino-esters, alcohols, esters, ketones, ethers, and other classes of compounds which contain oxygen, nitrogen, or other atoms which can act as proton acceptors or electron donors. The classes of compounds may be selected from the aromatic aliphatic, alicyclic, or heterocyclic series, and may contain saturated or unsaturated, straight or branched chains, and may contain other substituents such as halogen, nitrile, or nitro groups, provided the compound retains its basic properties. The bases may also be monomeric, polymerizable monomeric, or polymeric in nature. Amines and alcohols are particularly suited to producing desirable modifications to mineral surfaces by this process.

A wide range of amines or alcohols is suitable for use in this process, including primary, secondary and tertiary amines and alcohols. In specific cases, polymeric compounds with suitable functional groups may be used to modify the acidic surface, for example "Versamids" or polyamines with terminal amino groups to give useful products. Amines of naturally-occurring materials, such as tallow amines are also useful.

According to a third aspect of this invention, the acidic mineral may be modified by a polymeric coating formed by treating the mineral with an organic monomer or mixture of monomers susceptible to acid-catalysed polymerization, followed by neutralisation and termination of the polymerization reaction by the addition of an organic or inorganic base or bases. Such monomers include, but are not restricted to, styrene and substituted styrenes; conjugated dienes such as butadiene, isoprene, and piperylene; vinyl ethers; vinyl-heterocycles such as N-vinylcarbazole; divinylbenzene and other divinyl-aromatics, divinyloxyalkanes; vinyl ketones; and epoxides. The monomers can contain aromatic, alicyclic, alipatic, or heterocyclic groups, and other substituents such as halogens or ether groups, provided the substituents do not inhibit the acid-catalysed polymerization process. The bases used for neutralisation can include water, ammonia, organic alcohols, amines, or other bases described herein.

If the coated mineral is to be further modified as described in the fourth aspect of this invention or to be subsequently incorporated in organic systems and subjected to radical-induced reactions, for example, in styrene-polyester resins, elastomers, or melt-processed polyolefines, it is often preferred to select a base containing unsaturated groups susceptible to free-radical attack and/or polymerization, such as the aminoalkyl esters of acrylic or methacrylic acid, allylamine and substituted allylamines, vinyl silanes, silylalkyl esters of acrylic or methacrylic acids, or derivatives of these.

The neutralisation by base is an essential part of this invention and amongst other benefits, serves to prevent deleterious acid-induced reactions when the modified filler is incorporated in polymer or prepolymer compositions.

The products obtained from the above described processes using organic bases or polymerizable monomers also form part of this invention. They are ideally suited as pigments and fillers for use in organic media and polymer compositions, including acrylic resins, alkyd resins, aminoplast and phenoplast resins, polyesters, styrenated polyesters, polyamides, polyurethanes, rubbers and other elastomers, polyvinyl chloride compositions, polystyrene, polyolefines, their derivatives, and mixtures or solutions containing any of these. Such compositions containing the modified minerals also form part of this invention.

The modified materials of this invention, when used in such organic media and polymer compositions exhibit, amongst others, the following improved properties:- i. The materials disperse more quickly and more thoroughly in non-aqueous systems.

ii. They exhibit a greater degree of dispersion and much less tendency to flocculate.

iii. When dispersed in non-aqueous systems or solutions of organic polymers, the viscosity of the mixtures is significantly lower than that of mixtures containing unmodified minerals. This effect is often readily changed by suitable selection of the base or monomeric coating-precursors. Thus, one base or polymeric coating may lower the viscosity of the material in a polyester system but not in rubber, whilst another may produce the opposite effect.

iv. A high bulking factor is often shown by the treated materials, which is an indication of the extremely good dispersion obtained by these processes.

v. The treatment makes the surface more organophilic and hence more hydrophobic. Thus the wetting properties of the material in aqueous and non-aqueous systems can be modified to a desired level.

vi. The modified minerals resist the absorption of moisture from the air.

A fourth aspect of this invention relates to the modification of the acidic minerals to produce pigments and fillers capable of reinforcing polymeric compositions in which they may be incorporated. A wide variety of inorganic pigments and fillers are used in plastics and elastomer compositions. With the notable exception of certain grades of silica and carbon black having large specific surfaces, and some other materials such as glass, carbon, or asbestos fibres, the mineral fillers are usually "non-reinforcing", that is, their incorporation in plastics media usually results in compositions of increased stiffness and brittleness but without increased tensile strength or toughness.

Previous attempts to modify the surface of minerals to yield reinforcing fillers have only been partially successful. It is known in prior art that reinforcing fillers can be produced by encapsulation of the mineral particles in a surface-bonded cross-linked polymeric composition containing residual vinylic unsaturation plus added free-radical initiators to promote grafting of the coating to the polymeric composition incorporating the filler during compounding or subsequent curing processes. Previous methods for producing such coatings have involved the thermally activated polymerization of suitable monomer mixtures on or around the surface with the use of added initiators, generally of the free-radical type. Such initiators are expensive, and they are often required in larger than usual amounts because non-radical decomposition induced by the natural surface acidity of many of the mineral substrates. Similarly, in attempting to ensure graft reactions between the polymer coating and the matrix polymer, other additional and more thermally stable free-radical initiators, typically peroxides or hydroperoxides have to be added to the coating precursors mixture or to the filled polymer formulation prior to compounding. This method has the added disadvantage that the graft-initiator may diffuse away from the filler surface during compounding or curing, reducing its efficiency in promoting the desired grafting reaction.

This aspect of the present invention seeks to overcome the problems of the prior art by (a) using the surface of the pigment particle as its own catalyst for formation of a crosslinked polymer layer which is bonded to the surface; and (b) forming the grafting radical initiator as a part of the polymer structure. Such polymers can be produced using the monomers or monomer mixtures as described hereinbefore, and or their derivatives yielding coatings containing oxidisable groups which may include ethylenic allylic acetylenic or aromatic unsaturation, poly-unsaturated systems or containing secondary or tertiary or other functional groups which are capable of conversion to peroxides, hydroperoxides, or ozonides, or other species which can act as free-radical generators, by treatment of the coated filler with ozone or with oxygen or other oxidants with or without activation of the oxidation process by heating, actinic light, or the addition of catalytic amounts of free-radical initiators. Alternatively, the coating material may contain functional groups which can form adducts with peroxides, hydroperoxides or substituted peroxide derivatives, or other species capable of acting as radical generators.

As a further alternative, the coating material may contain as reactive groups species which can initiate grafting and/or crosslinking reactions between the coating and matrix polymers or other ingredients of the plastics or elastomer composition by other than radical-induced processes, or the coating may contain groups capable of conversion to such reactive species.

In addition to the radical generators, or their precursors, the coating material may contain reactive groups, including vinylic or substituted vinylic groups, capable of undergoing crosslinking reactions either during the coating process, during subsequent treatment of the coated pigment or filler, or during the compounding or curing of materials incorporating the coated pigment or filler. Depending on the particular monomer or monomer mixture employed, the coating polymer crosslinks may be formed during the initial polymerization, during the oxidation process, or during the subsequent compounding or curing of compositions containing the modified mineral although such crosslinking is not essential. Bonding of the polymer coating to the mineral surface can be enhanced by addition of unsaturated amines, amino-substituted acrylic derivatives, or reactive unsaturated silanes to the modified mineral before or after the oxidation process as described herein. The modified fillers are suitable for incorporation in any of the polymer compositions previously described, and yield products with improved tensile strength, and impact strength compared to conventional mineral filled compositions.

The preferred method for producing an acidic surface coating on a particulate mineral pigment or filler, the first aspect of this invention, comprises steps of:

a. forming a coating of an aluminum compound on the surface of the particles;

b. forming the coated particles into a slurry in an aqueous medium at a pH of less than 5.0;

c. recoverying the particles from the slurry; and d. heating the particles; thereby to produce particles having a significant number of acidic sites on the surface thereof with a pKa value of 2.8 or less.

Similar techniques are employed for producing coatings containing other multivalent metal compounds.

The steps of the process for application of the preferred alumina-silica coating will now be considered in detail.

a. Coating of mineral particles.

The order and manner in which the aluminium (and silicon) compounds are deposited are not critical, although certain procedures work better with some pigments. Similarly it is sometimes necessary or desirable to subject the coated pigment or filler to a treatment such as a heat treatment prior to pH adjustment and heating. The coating step may thus be carried out by slurrying the mineral in water and adding a solution of the coating materials, for example, by adding the solution of a soluble aluminium salt such as aluminium sulphate. If an aluminium silicate type of coating is being prepared, then this may be done in any convenient way. A solution of an aluminium salt, such as aluminium sulphate or sodium aluminate may be added first and then a silicate solution added thereafter. Alternatively the order can be reversed, or the two solutions added together or in small increments alternately. If desired, the salt or salts may be added in solid form. Since the coating is not meant to correspond exactly to aluminium silicate, the molar ratio of silicon compound to aluminium compound can vary from 0.1 up to 5:1.

Some attention to the concentration of the added salts is required to ensure that a satisfactory gel coat is obtained - such precautions are known art.

The mineral used as starting material will normally be a finely divided, particulate material. It can be any of the commercially available mineral pigment or filler materials, either already coated or without coating. The "acidity" produced in these materials may vary according to the nature of the starting material its pretreatment (if any), and particularly its crystal shape and particle size. The smaller the particle size the greater the number of acid sites that will be produced by the process, because of the larger surface area exposed to the process.

Normally the coated material is filtered off and washed with water before proceeding to the next step of the process. However, in some cases an adjustment to the pH can be made direct to the slurry during and/or at the conclusion of the coating procedure. It is also sometimes advantageous to calcine the coated material before proceeding to the second step of the process.

b. pH adjustment.

The concentration of the slurry is not critical but in practice is limited by difficulties in stirring if it is too concentrated, and cost, if it is too dilute. If desired, the acid solution may be prepared first to a pH of less than 5 and the solid added to it with further adjustments to the pH if necessary.

The pH to which the slurry must be adjusted will vary according to the type of mineral material and the "acidity" desired in the material. Thus in many cases a pH of 2 to 3 or lower is desirable.

The adjustment to pH may be brought about by the addition of any water soluble acidic material. Thus an acid or an acidic salt or oxide may be employed for this purpose. The acid used can be organic or inorganic. Mixtures of acids, either inorganic or organic or both are included. Typically, sulphuric acid, hydrochloric acid, phosphoric acid, acetic acid, formic acid, methacrylic acid, acrylic acid and other saturated or unsaturated aliphatic carboxylic acids, benzoic acid and other organic aromatic acids may be employed. Acid salts such as sodium hydrogen sulphate or aluminium potassium sulphate may be used, or acidic oxides such as sulphur trioxide.

c. Recovery of the particles.

d. Heat treatment.

Recovery of the coated particles is achieved by conventional processes for examle, by dewatering and drying. The final heating of the recovered material can be carried out in any suitable equipment between the temperatures of about 100° and 800°C. The best results are usually obtained by heating in the range of 120° – 450°C. The product should be heated for sufficient time to produce the acidity desired on the surface. The time required will depend on the equipment used, but must be sufficient to remove free water adhering to the material and then to convert the coating to produce the desired acidic sites. It may be extended for longer periods without adversely affecting the properties of the product.

The final product may require size selection where a small amount of agglomeration results from the heat treatment.

The above-described operations result in materials with significant numbers of sites with "acidities" less than pKa 2.8 and hence improved properties. As will be seen from the following examples, significant acidity is produced in all cases when treated according to this invention. Furthermore, by testing each as described herein, it is found that some sites with acid strengths in the pKa −3.0 to −5.6 range are present in most cases but the majority are in the range +1.5 to −3.0.

Modification of the acidic minerals with organic bases, the second aspect of the invention in general involves the bringing together the ingredients in any suitable manner. The two components can be physically blended or mixed in any suitable equipment without the addition or use of any other component. The choice of equipment will vary according to the process conditions and the product requirements, e.g. whether the base component is liquid or solid, the amount of base to be added, and so on. Any of the conventional mixing equipment may be used although a preferred technique involves the use of a fluidised bed mixer in which the base is added as a liquid, solution or vapour to the fluidised acidic mineral. If desired, additional components can be mixed or blended with the product before, during or after the incorporation of the organic base.

An alternative, very convenient method for achieving uniform adsorption of the organic base consists in the use of a suitable non-aqueous solvent in which the acidic mineral can be slurried. The organic base can be added to the slurry either incrementally or continuously, alone or dissolved in the same or a different solvent. Alternatively, the organic base may be dissolved in the solvent and the mineral added to form a slurry. Typical suitable solvents include benzene and similar aromatic hydrocarbons, aliphatic hydrocarbons such as hexane, heptane and their homologues, petroleum fractions, kerosene, halogenated solvents such as trichloroethylene and carbon tetrachloride, esters and ethers. In selecting the solvent, the prime consideration is that the interaction between the solvent and the mineral is less than that between the organic base and the mineral, i.e. the solvent should be less basic than the modifying agent.

As water can be adsorbed on the acidic sites of the mineral, and may interfere with the adsorption of the base, it is often desirable to dry the mineral, preferably at temperatures of 100° – 150°C, before treatment with the base. In general, the amount of organic base used may be up to 2% of the weight of the mineral, but the optimum proportion of base to mineral cannot be determined by any general rule. With polymeric bases, higher proportions can generally be used. The surface area and particle size of the mineral, as well as any tendency to intercalate the base, will affect the optimum proportions. In general terms, minerals with the larger surface areas and the smaller particle sizes require the greater proportions of base to mineral for achievement of the desired result.

Modifying the acidic mineral by treatment with polymerizable monomers, the third aspect of the invention, is preferably performed in such a way that the particles are each coated with polymer but remain separate. For example, the mineral can be treated in a fluidised bed, the monomer being introduced as a vapour at a suitable temperature, or in solution with a volatile solvent which evaporates from the bed. Alternatively, treatment with the monomers can be achieved by introduction of their vapours into a evacuated tumbler-mixer containing the mineral; at least 5% w/w of styrene, isoprene, or piperylene can be applid to kaolin clay minerals by this technique without the applied of polymer-boned aggregates.

It is also possible to apply the monomer by dispersing the mineral in a solvent which does not interfere with the catalytic acidity of the mineral surface, in which the monomer is dissolved or to which the monomer is added, continuously or incrementally. Typical solvents are benzene and similar aromatic hydrocarbons, aliphatic hydrocarbons, and petroleum fractions. It is an advantage if the polymer formed is insoluble in the solvent. This method is only preferred for systems employing polar monomers of low volatility, or monomer mixtures containing components of widely differing volatility.

The polymerizations generally proceed rapidly at room temperature and to high conversion. However, a higher order of mineral surface acidity, typically less than pKa −3.0, is required for polymerization of the monomers, and the treatment requires anhydrous reaction conditions. The amount of monomer used depends on the nature of the mineral and the end use of the product; for improved dispersibility of kaolins and modified talcs, the weight of monomer used is 0.1% to 50% of the weight of the mineral, and preferably in the range 1% to 5%. Colour development, possibly due to adsorbed carbonium ion species on the mineral surface, is often observed during the polymerization reaction. This colour is discharged, and the reaction terminated by addition, by methods used for addition of the monomer described herein, of water vapour, ammonia, or organic bases listed herein.

Neutralization prevents deleterious colour formation which may occur during compounding of the modified mineral at high temperatures in molten polymers. Neutralization of the reaction products by treatment with water vapour, ammonia, alcohols or esters prior to any oxidation as described herein, is desirable to increase the storage life of the oxidized product, the peroxide or hydroperoxide groups of which could be destroyed by a strongly acid mineral surface.

The acid minerals may be modified to provide reinforcing fillers, the fourth aspect of the invention, by first coating with a suitable polymer of the composition described herein, and exposing the polymer coated mineral to ozonised oxygen, or preferably to atmospheric oxygen at temperatures below 50°C. Polystyrene-based coatings require treatment with ozone to yield a useful concentration of peroxidic species. The preferred polymer coatings are prepared using butadiene, isoprene, or piperylene as the monomer component, in amounts between 1% and 20% w/w of mineral in the case of the kaolin group clay minerals. The polymer-coated mineral is neutralized by addition of 0.1% to 0.5% of ammonia or an organic amine, or preferably 0.5% to 2.0% of dimethylamino ethyl methacrylate, or other acrylic aminoester which can undergo radical-induced grafting to the mineral. Such grafting enhances the bonds between the coating and the mineral surface. The polymer coated mineral is then exposed to a current of air or oxygen in a fluidized bed on tumbling mixer at temperatures between 15° and 50°C, and thereby undergoes rapid autoxidation with the formation of polymer hydroperoxides. These oxidized materials can initiate the polymerization and grafting of styrene and acrylic monomers and can improve the mechanical properties of polyolefins incorporating them as fillers.

Plastics and elastomeric compositions containing these reinforcing fillers can be prepared by mixing the oxidised materials described with the matrix polymer in conventional hot processing equipment. It is preferable, although not essential, that the finely divided ingredients be dry-blended and then mixed in a Banbury or similar intensive mixer. The ratio of filler to matrix polymer is a matter of choice, and the proportion of coated material may comprise from 1 to 80% of the composition. Other ingredients such as plastics, dyes, additional cross-linking or grafting agents, etc., may be incorporated in the composition. The compounding conditions are dependent on the nature of the coating material and the matrix polymer, although in the absence of added accelerators, a typical peroxidised coating would require compounding at 100° – 200°C for 5 – 30 minutes duration for completion of the grafting and further cross-linking reactions.

Alternatively, the ingredients may be compounded under conditions so that some of the radical generating species remain intact, and the radical-induced reactions completed in a subsequent curing process.

Alternatively, the reinforcing fillers may be incorporated in suitable monomer or prepolymer mixtures, for example, styrene, methyl methacrylate, or styrene-polyester compositions, and the modified mineral used as both a filler and as an initiator of polymerization or curing reaction.

This invention includes all of the methods and products of the various aspects of the invention described above.

In order to illustrate the invention more fully, the following non-limiting examples are given. All parts are by weight, unless otherwise stated, and temperatures are uncorrected.

EXAMPLE I a. A dispersion of 50 parts of talc in 100 parts of water was treated by the addition, at 20°C with stirring, of a solution of 3.2 parts of sodium aluminate (NaAlO$_2$) in 50 parts of water. After 10 minutes a solution of 5.6 parts of sodium metasilicate (Na$_2$SiO$_3$.5H$_2$O) in 50 parts of water was added to the mixture, and after a further 10 minutes the mixture was adjusted to pH 7 by the addition of dilute sulphuric acid. The mixture was stood for 16 hours and then filtered to cover the alumina-silica coated talc, which was then washed with water and dried at 50°C.

b. The product from (a) was slurried with sufficient dilute sulphuric acid to give a mixture having pH 2.5 to 3.0, and the mixture stood for 1 hour. The acidified product was then filtered off, washed with water, dried, and calcined at 450°C for 2 hours.

c. The product from (a) was calcined for 2 hours, and then treated as described in section (b) of the method.

d. The product from (a) was treated as described in section (b) of the method, except that a 5% aqueous solution of potassium alum was used for the acidification of the slurry instead of dilute sulphur acid.

e. The product from (a) was calcined at 450°C for 2 hours, and then treated as described in section (d).

f. The product from (a) was treated as described in section (b), except that the calcination was performed at 300°C.

g. The materials obtained by these treatments were tested according to the method described earlier to determine the concentration of acid sites produced having pKa values of 2.8 or less:

| | |
|---|---|
| Product (b) | 10 μ equiv/g. |
| Product (c) | 10 μ equiv/g. |
| Product (d) | 9 μ equiv/g. |
| Product (e) | 9 μ equiv/g. |
| Product (f) | 9 μ equiv/g. |
| Untreated talc | <1 μ equiv/g. | h. 100 parts of the product prepared by the method of section (b) were placed in a high-speed mixer (Sorval Omnimixer), 0.1 parts of tallowamine (as a 10% solution in petroleum ether) was added, and the contents vigorously mixed for 2 minutes. A further 0.1 parts of tallowamine was added and the contents mixed for a further 4 minutes. The product was dried at 50°C, and the tallowamine-coated talc so produced was dispersed at 25% w/w in paraffin oil and tested using a Brookfield LVT viscometer at two sheer rates:

| | Viscosity at low shear | Viscosity at high shear |
|---|---|---|
| Untreated talc | 6.3 poise | 11.3 poise |
| Coated talc (h) | 4.8 poise | 8.3 poise |

EXAMPLE II.

a. A dispersion of 250 parts of talc in 750 parts of water at 70°C was treated by the addition, with stirring, over a period of 1/2 hour, of a solution of 12.5 parts of sodium metasilicate in 115 parts of water, followed by a similar addition of a solution of 40 parts of aluminium sulphate (Al$_2$(SO$_4$)$_3$.16H$_2$O) in 250 parts of water. The mixture was adjusted to pH 3.5 – 4.0 by the addition of dilute sulphuric acid and then filtered. The solids were washed with water, dried at 120°C, and cooled in a sealed container. The alumina-silica coated talc so produced contained 10 μ equiv/g of acid sites having pKa of −3.0 or less, and 20 μ equiv/g of sites with pKa of 2.8 or less.

b. 100 parts of the dried product (a) were placed in an evacuated tumbling mixer at 20 °C and exposed to the vapour from 5 parts of piperylene, which was completely adsorbed by polymerization on the surface of the talc, after a period of 1 1/2 hours. The reaction was terminated by the addition of 1 part of d. 0.880 aqueous ammonia, and the product dried at 50°C in a vacuum oven. A dispersion of the polypiperylene-coated talc at 30 % w/w in paraffin oil showed improved rheology compared to a similar dispersion containing untreated talc:

| | Yield stress | Viscosity at infinite shear |
|---|---|---|
| Untreated talc | 35.4 dyne/cm$^2$ | 3.6 poise |
| Coated talc (b) | 1.44 dyne/cm$^2$ | 3.5 poise | c. The undried product prepared by the method of section (a) of this example was tumbled in a current of air at 30°C for 16 hours, yielding an oxidised polypiperylene-coated talc containing 95 μ equiv/g of peroxide, as determined by iodometric titration. 20 parts of this product were mixed with 80 parts of high-density polyethylene at 165°C, and the composition pressed into sheets and cured in the press at 175°C for 10 minutes. Similar sheets were prepared using untreated talc, and alumina-silica coated talc prepared by the method of section (a) of this example, and their tensile properties tested:

| | Tensile strength | Elongation at break |
|---|---|---|
| Untreated talc | 261 Kg/cm$^2$ | 13% |
| Coated talc (a) | 298 Kg/cm$^2$ | 25% |
| Coated talc (c) | 306 Kg/cm$^2$ | 125% |

EXAMPLE III

Superfine whiting (calcium carbonate) was treated using the method of example II, section (a), except that the mixture was adjusted to pH7 instead of to pH 3.5 to 4.0. The product was dispersed at 30% w/w in paraffin oil, yielding a mixture having improved rheology:

|  | Yield stress | Viscosity at infinite shear |
|---|---|---|
| Untreated whiting | 968 dyne/cm$^2$ | 2.0 poise |
| Coated whiting | 0.3 dyne/cm$^2$ | 2.6 poise |

EXAMPLE IV.

100 parts of talc treated by the method of Example II section (a) were dried at 120°C for 8 hours, and then placed in an evacuated tumbling mixer at 20°C. 5 parts of styrene vapour were added, the monomer being completely adsorbed by polymerization on the surface of the talc. After 4 hours the reaction was terminated by the addition of 1 part of ethanol, and the product exposed to a stream of ozonised oxygen to yield an oxidised polystyrene-coated talc containing the equivalent of 40 $\mu$ equiv/g of iodometric peroxide This product was mixed at 20% w/w in low-density polyethylene at 125°C, and the composition pressed into sheets which were cured in the press at 150°C for 10 minutes. The filled polyethylene so produced showed improved tensile properties compared to a similar composition containing untreated talc:

|  | Tensile strength | Elongation at break |
|---|---|---|
| Untreated talc | 94 Kg/cm$^2$ | 95% |
| Coated talc | 104 Kg/cm$^2$ | 360% |

EXAMPLE V.

Talc was treated by the method of Example II sections (a) and (b) using butyl vinyl ether instead of piperylene. High-density polyethylene containing 20% w/w of the poly(butyl vinyl ether)-coated talc showed improved tensile properties:

|  | Tensile strength | Elongation at break |
|---|---|---|
| Untreated talc | 261 Kg/cm$^2$ | 13% |
| Coated talc | 298 Kg/cm$^2$ | 250% |

EXAMPLE VI.

100 parts of an acid-flocced kaolin (Hydrite PX, supplied by the Pacific Kaolin Ltd.) were dried at 120°C for 8 hours, and then treated by the method of Example II, sections (b) and (c), with 5 parts of piperylene, terminating the reaction with 1 part of d. 0.880 aqueous ammonia. The oxidised polypiperylene-coated kaolin, containing 80 $\mu$ equiv/g of iodometric peroxide, was mixed at 30% w/w in paraffin oil to yield dispersions having improved rheology:

|  | Yield stress | Viscosity at infinite shear |
|---|---|---|
| Untreated kaolin | 936 dyne/cm$^2$ | 2.3 poise |
| Coated kaolin | 0.2 dyne/cm$^2$ | 2.3 poise |

EXAMPLE VII.

100 parts of an acid-flocced kaolin (Hydrite 10, supplied by the Pacific Kaolin Ltd.) were dried at 120°C for 8 hours, and then treated by the method of Example II, sections (b) and (c), with 5 parts of piperylene, terminating the reaction with 0.2 parts of n-hexylamine. The oxidised polypiperylene-coated kaolin, containing 120 $\mu$ equiv/g of iodometric peroxide, was incorporated at 20% w/w in high-density polyethylene to yield a composition having improved mechanical properties:

|  | Tensile strength | Elongation at break | Impact strength |
|---|---|---|---|
| Untreated kaolin | 279 Kg/cm$^2$ | 100% | 390 Kg/m |
| Coated kaolin | 316 Kg/cm$^2$ | 690% | 565 Kg/m |

EXAMPLE VIII.

Acid-flocced kaolin (Hydrite 10) was treated with piperylene by the method of Example VII, terminating the reaction with 0.5 parts of allylamine instead of 0.2 parts of hexylamine. High-density polyethylene containing 20% w/w of the treated kaolin showed improved mechanical properties:

|  | Tensile strength | Elongation at break | Impact strength |
|---|---|---|---|
| Untreated kaolin | 279 Kg/cm$^2$ | 100% | 390 Kg/m |
| Coated kaolin | 301 Kg/cm$^2$ | 400% | 596 Kg/m |

EXAMPLE IX.

100 parts of acid-flocced kaolin (Hydrite 10) were treated with 5 parts of isoprene using the method of Example VII, and terminating the reaction by the addition of 1 part of d. 0.880 aqueous ammonia. The oxidised polyisoprene-coated kaolin, containing 68 $\mu$ equiv/g of iodometric peroxide, was incorporated at 20% w/w in high-density polyethylene to yield a composition having improved mechanical properties compared to those of a similar composition containing untreated kaolin: tensile strength, 303 Kg/cm$^2$; elongation at break, 60%; impact strength, 512 Kg/m.

EXAMPLE X.

100 parts of acid-flocced kaolin (Hydrite 10) were treated with 2 parts of $\beta$-pinene using the method of Example VII, and terminating the reaction with 1 part of d.0.880 aqueous ammonia. The oxidised polypinene-coated kaolin, containing 40 $\mu$ equiv/g of iodometric peroxide, was incorporated at 20% w/w in high-density polyethylene to yield a composition having improved mechanical properties compared to those of a similar composition containing untreated kaolin: tensile strength, 286 Kg/cm$^2$; elongation at break, 210%; impact strength, 515Kg/m.

EXAMPLE XI.

100 parts of acid-flocced kaolin (Hydrite 10) were treated with 5 parts of butyl vinyl ether by the method of Example VII, terminating the reaction with 1 part of d.0.880 aqueous ammonia, and oxidising the product by a brief treatment with ozonised oxygen. The oxidised poly(butyl vinyl ether)-coated kaolin, containing 20 $\mu$ equiv/g of iodometric peroxide, was incorporated at 20% w/w in high-density polyethylene to yield a composition having improved mechanical properties compared to those of a similar composition containing untreated kaolin: tensile strength, 298 Kg/cm$^2$; elongation at break, 360%; impact strength, 812 Kg/m.

EXAMPLE XII.

100 parts of acid-flocced kaolin (Hydrite 10), previously dried at 120°C for 8 hours, were fluidised in a recirculating dry air stream at 20°C. A mixture of 4 parts of butyl vinyl ether and 2 parts of 1,4-bis(-vinyloxy) butane was introduced, over a period of ½ hour, by atomisation into the air stream, and adsorbed by polymerisation on the kaolin surface. After an additional 1 hour of fluidisation, the reaction was terminated by the addition of 1 part of atomised dimethylamino-ethyl methacrylate. 20 parts of the polymer-coated kaolin were mixed with 80 parts of high-density polyethylene in a Banbury-type mixer, at a stock temperature of 190°C for 8 minutes, using polymer radical produced by thermomechanical processes during compounding to initiate grafting reactions between the polyethylene and the coating composition. The product had improved mechanical properties compared to those of a similar composition containing untreated kaolin: tensile strength, 314 Kg.cm$^2$; elongation at break, 480%; impact strength, 780 Kg/m.

What we claim is:

1. A pigment or filler material consisting of a particulate mineral other than titanium dioxide having a surface coating with a significant number of acidic sites with pKa values less than 2.8, and which has been modified by the addition of a polymeric coating formed by in situ acid-catalyzed polymerization of at least one organic monomer, followed by neutralization of the surface with a base which terminates the polymerization reaction.

2. A pigment or filler material as claimed in claim 1, wherein the monomer is selected from the group consisting of styrene and substituted styrenes, vinyl ethers, vinyl-heterocycles, divinyl-aromatics, divinyl-oxyalkanes, vinyl ketones and epoxides.

3. A pigment or filler material as claimed in claim 1, wherein the base is an organic base selected from the group consisting of amines, amides, amino esters, alcohols, esters, ketones and ethers.

4. A pigment or filler material as claimed in claim 1, wherein the base is an organic base which contains unsaturated groups susceptible to free radical attack and/or polymerization.

5. A pigment or filler material as claimed in claim 4, wherein the organic base is selected from the group consisting of aminoalkyl esters of acrylic and methacrylic acids, allylamine and substituted allylamines, vinyl silanes and silylalkyl esters of acrylic and methacrylic acids.

6. A pigment or filler material as claimed in claim 1, wherein the polymeric coating includes functional groups which are capable of oxidation to species which can act as free radical generators.

7. A pigment or filler material as claimed in claim 6, wherein the functional groups are capable of oxidation to peroxides, hydroperoxides or ozonides.

8. A pigment or filler material as claimed in claim 1, wherein the polymeric coating includes reactive groups or groups convertible into such reactive groups which can initiate grafting reactions between the coating and a polymeric matrix into which the pigment or filler material is to be incorporated.

9. A pigment or filler material as claimed in claim 3 wherein the organic base is an amine.

* * * * *

UNITED STATES PATENT OFFICE
CERTIFICATE OF CORRECTION

PATENT NO. : 3,963,512

DATED : June 15, 1976

INVENTOR(S) : Jean Drummond Swift et al.

It is certified that error appears in the above-identified patent and that said Letters Patent are hereby corrected as shown below:

Column 9, line 52, "a" should read --an--.

Column 9, line 54, "applid" should read --applied--.

Column 9, line 55, "applied" should read --formation--.

Column 11, line 31, "cover" should read --recover--.

Signed and Sealed this

Fourteenth Day of September 1976

[SEAL]

Attest:

RUTH C. MASON
*Attesting Officer*

C. MARSHALL DANN
*Commissioner of Patents and Trademarks*